United States Patent [19]

Darcy

[11] Patent Number: 5,416,272
[45] Date of Patent: May 16, 1995

[54] DEVICE FOR PREVENTING INSULATION FROM SHRINKING BACK ON A POWER CABLE HAVING SYNTHETIC INSULATION

[75] Inventor: André Darcy, Calais, France

[73] Assignee: Alcatel Cable, Clichy Cedex, France

[21] Appl. No.: 143,544

[22] Filed: Oct. 29, 1993

[30] Foreign Application Priority Data

Oct. 29, 1992 [FR] France .................. 92 12959

[51] Int. Cl.⁶ ............... H02G 15/02; H02G 15/08
[52] U.S. Cl. ................... 174/74 R; 174/75 R
[58] Field of Search .......... 174/74 R, 74 A, 73.1, 174/75 C, 75 R

[56] References Cited

U.S. PATENT DOCUMENTS

| | | | |
|---|---|---|---|
| 2,691,058 | 10/1954 | Millar | 174/36 |
| 3,601,524 | 8/1971 | Kauffman | 174/74 R |
| 3,629,488 | 12/1971 | Mixon, Jr. | 174/73.1 |
| 3,828,115 | 8/1974 | Hvizd, Jr. | 174/73.1 |
| 4,006,288 | 2/1977 | Stevens | 174/73 R |
| 4,034,151 | 7/1977 | Silva et al. | 174/73.1 |
| 4,424,410 | 1/1984 | Edgerton | 174/73.1 |
| 4,698,458 | 10/1987 | Parmigiani et al. | 174/73.1 |
| 5,234,515 | 8/1993 | Sekkelsten | 174/75 R |

FOREIGN PATENT DOCUMENTS 2311436 12/1976 France .
WO8602210 4/1986 WIPO .

*Primary Examiner*—Morris H. Nimmo
*Attorney, Agent, or Firm*—Sughrue, Mion, Zinn, Macpeak & Seas

[57] ABSTRACT

A insulation-shrinkage prevention device for preventing insulation from shrinking back on a power cable which has synthetic insulation and which is to receive connection equipment on a "prepared" end of said cable, the device including a shouldered ring mounted on said prepared end and secured to the bared conductor, which ring has a fixing shoulder for fixing to the periphery of the insulation, an abutment shoulder for abutting against the end of the insulation, and an integrated retaining device for securing the ring to the bared conductor.

11 Claims, 2 Drawing Sheets

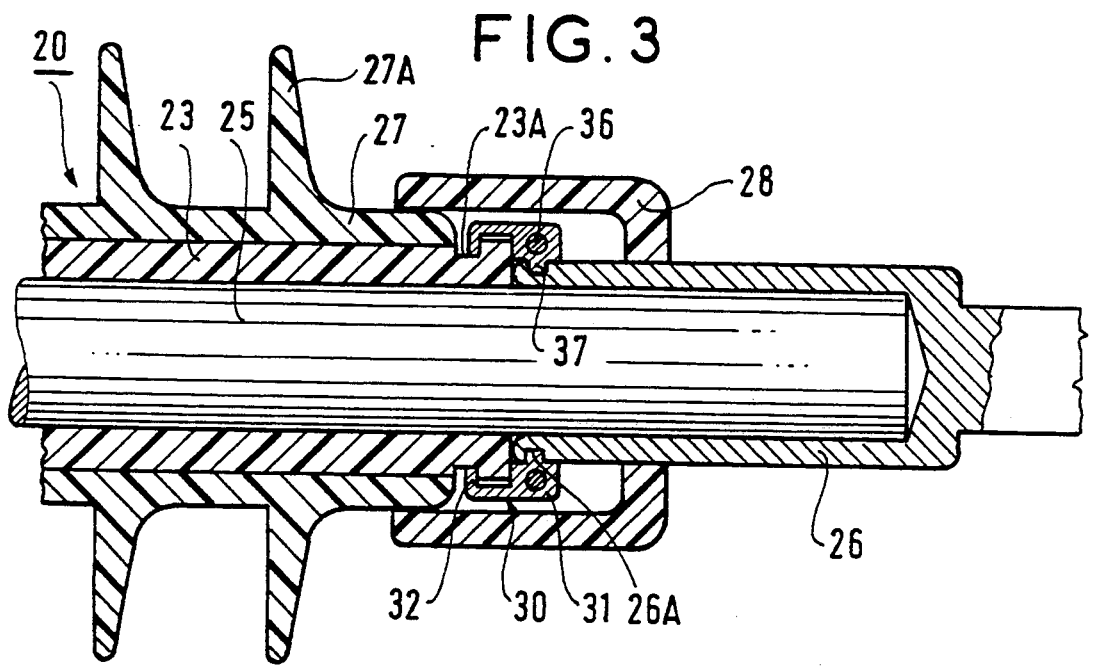
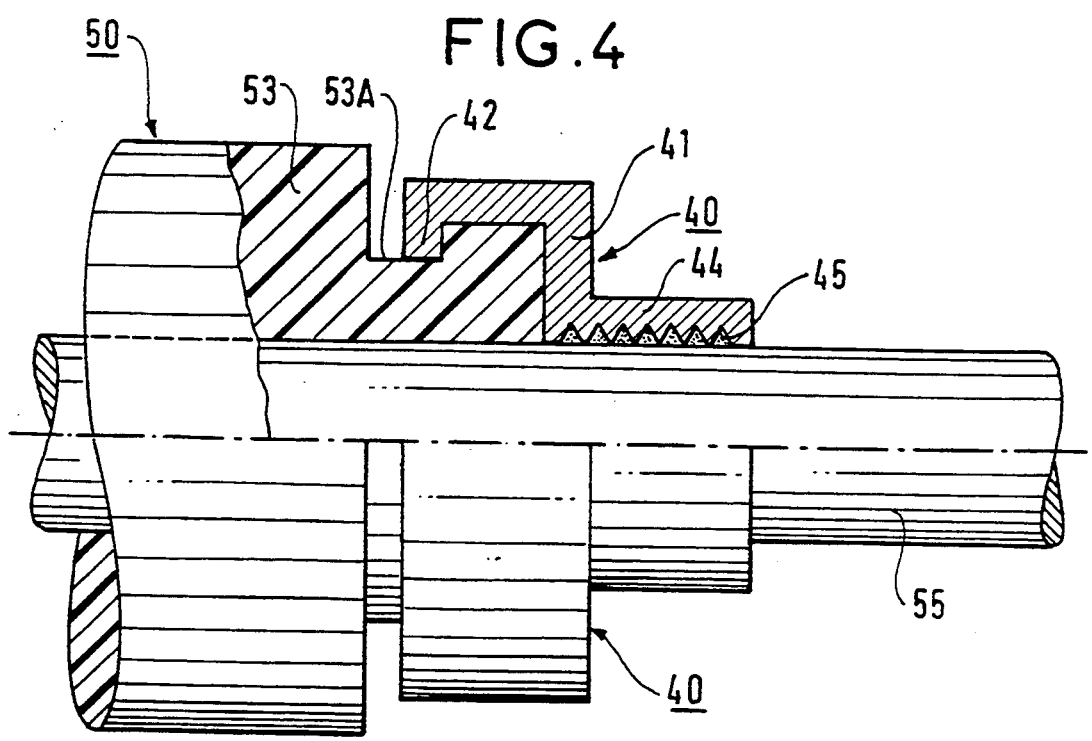

DEVICE FOR PREVENTING INSULATION FROM SHRINKING BACK ON A POWER CABLE HAVING SYNTHETIC INSULATION

The present invention concerns medium, high, or very high voltage power cables having conductors covered with synthetic insulation. More particularly, the invention relates to an insulation-shrinkage prevention device for preventing insulation from shrinking back on such a power cable.

BACKGROUND OF THE INVENTION

Such an insulation-shrinkage prevention device is designed to equip a "prepared" end of such a cable, which end is bared in a staggered manner.

Document EP-A-0199742 describes a splice between two such cables whose ends to be interconnected are prepared prior to splicing. In that splice, the conductors of the two cables are mechanically interconnected end-to-end and are surrounded by a metal adaptor fixed on the respective end portions of the insulation on the two cables. That adaptor is cylindrical and is formed by two semi-cylindrical portions that can be joined together. A one-piece sleeve surrounds and clamps the adaptor and the portions of the cables on either side of the adaptor.

That adaptor is designed so as to have two annular internal walls that are not at the ends of the adaptor, through which walls the respective bared conductors of the two cables pass. The walls form abutments for the respective front faces of the insulation on the two cables. The ends of the adaptor cover the respective end portions of insulation, the outside diameters of which end portions are previously reduced so that the respective outside surfaces of the insulation are in alignment with the adaptor. The ends of the respective outside surfaces of the insulation are anchored by an inside annular rib provided on each end of the adaptor being engaged in a corresponding groove provided on the end portion of the insulation on each cable.

In that splice, in addition to performing its normal function of adapting to the diameters of the insulation, the adaptor also performs the additional function of locking the insulation on each cable relative to the insulation on the other cable. That adaptor therefore requires the dimensioning of the prepared end of each cable to be defined and performed accurately, as a function of the dimensions of the adaptor, and taking into account the way in which the conductors are interconnected, so that the adaptor can be fitted satisfactorily after the conductors have been interconnected. That adaptor makes it difficult to perform the operation of interconnecting the conductors, since the handling of the prepared ends and the forces exerted on the conductors during that operation may give rise to more or less significant shrinkage of the insulation, thereby making it difficult or impossible to fit the adaptor correctly.

Furthermore, such an adaptor cannot be used in a cable termination, and it therefore cannot be used in a termination to perform the additional function that it performs in a splice in that prior art.

OBJECTS AND SUMMARY OF THE INVENTION

An object of the invention is to avoid the drawbacks of that known solution, by locking the insulation of such a cable directly on a prepared end of the cable, while allowing the size of said prepared end free for any special adjustment to accommodate an item of equipment that it is to be connected to.

The present invention provides an insulation-shrinkage prevention device for preventing insulation from shrinking back on a power cable having synthetic insulation covering a conductor except on a prepared end of said cable, which end is to receive connection equipment, where the bared insulation is set back relative to the conductor which is also bared, said device including an abutment element for abutting against the front face of said insulation, and a fixing element for fixing to the periphery of the end portion of said insulation, wherein said device is constituted by a shouldered ring having two annular shoulders, one of which defines said abutment element, and the other defines said fixing element, said ring being mounted directly in place on said bared conductor and on said end portion of the insulation of said prepared end of said cable, and being secured to said bared conductor by retaining means integrated in said ring.

The device further has at least one of the following additional features:

said ring comprises two half-shells;
said shoulders are on the ends of said ring;
said retaining means are integrated in the abutment "front" shoulder, and they are constituted by screws engaged in holes passing through said ring at said front shoulder so that the screws do not project outside the ring;
said front shoulder has a rib projecting inwards in said ring, and received in a corresponding groove in an accessory belonging to said connection equipment; and
said retaining means are constituted by a cylindrical "front" section of said ring, which front section has an inside diameter substantially equal to the diameter of the bared conductor.

BRIEF DESCRIPTION OF THE DRAWINGS

The characteristics and advantages of the present invention appear from the following description of embodiments given with reference to the accompanying drawings, in which:

FIG. 3 is a diagrammatic view that is partially in elevation and partially in axial section showing a cable termination, in which the cable is also provided with an insulation-shrinkage prevention device of the invention; and FIG. 4 is a diagrammatic view that is partially in elevation and partially in section showing another embodiment of the insulation-shrinkage prevention device as mounted on a cable.

MORE DETAILED DESCRIPTION

Figure 1:
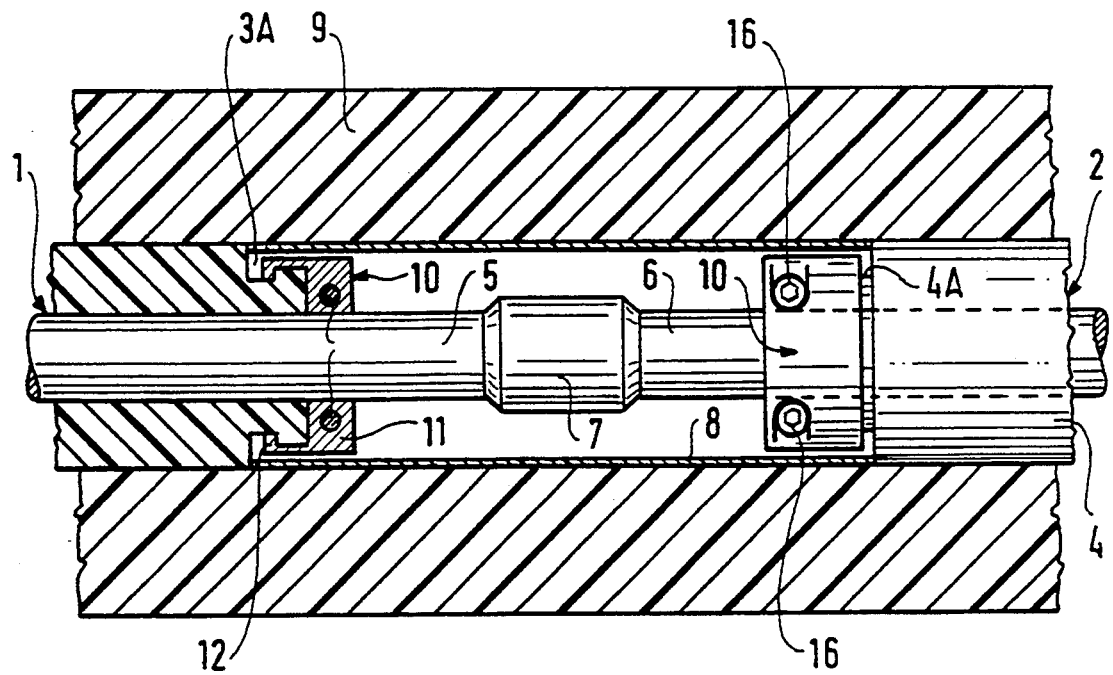
FIG. 1 is a diagrammatic view that is partially in elevation and partially in section showing a splice between two cables, each of which is provided with an insulation-shrinkage prevention device of the invention.

The splice shown in FIG. 1 is of a known type. It directly interconnects two power cables 1 and 2 having synthetic insulation 3, 4 covering their respective solid or multi-strand central conductors 5, 6. In a known manner that is not shown, each of the cables further includes a semiconductive screen surrounding its insulation, a protective outer sheath, and a metal screen directly underneath the protective sheath and optionally fixed thereto. Prior to being interconnected, the ends of the cables are stripped in staggered manner, and they are then referred to as "prepared" ends. Each of the prepared ends is also equipped with an insulation-shrinkage prevention device 10 which is mounted on the end before the splice is performed.

The splice comprises: a mechanical connection 7 between the conductors 5 and 6, which connection is performed, for example, by welding the conductors together end-to-end directly or via an electrical connecting piece; a conductive covering 8 surrounding the connection 7 and the previously reduced in diameter end portions of the insulation 3 and 4 on both of the cables, as well as the insulation-shrinkage prevention devices 10 already mounted on the respective prepared ends; and a resilient protective sleeve 9 which fits tightly over the covering 8 and the portions of insulation on either side thereof.

In a known manner that is not shown, the sleeve 9 has an inner semiconductive layer in contact with the covering 8 over the length thereof, and an outer semiconductive layer over the length of the inner layer, the ends of the sleeve covering the ends of the bared semiconductive screens of the two cables. The conductive covering 8, e.g. made of aluminum, has the same outside diameter as the insulation so that the respective outside surfaces of the insulation are in alignment with each other.

The insulation-shrinkage prevention device 10 mounted on the prepared end of each of the two cables 1 and 2 is constituted by a shouldered ring that is fixed to the end portion of the insulation and to the conductor of the cable which receives the ring.

The ring has two annular shoulders 11 and 12 which, in this embodiment, are provided one at either end of the ring.

The "front" shoulder 11 that is situated closer to the connection 7 is relatively thick and it defines a bore having a diameter that matches that of the conductor of the cable. The "rear" other shoulder 12 defines a bore having a diameter that is smaller than the already-reduced diameter of the end portion of the insulation of the cable. The rear shoulder corresponds to a groove 3A or 4A in the periphery of each of the end portions of insulation 3 and 4, in which groove the rear shoulder is engaged and is retained, while the front shoulder 11 abuts against the front face of the insulation, and is fixed thus to the conductor of the cable.

The shouldered ring as placed and locked on the end portion of the insulation caps the end portion of the insulation only but the periphery of the shouldered ring remains set slightly back from the periphery of the non-capped portion of the insulation.

Figure 2:
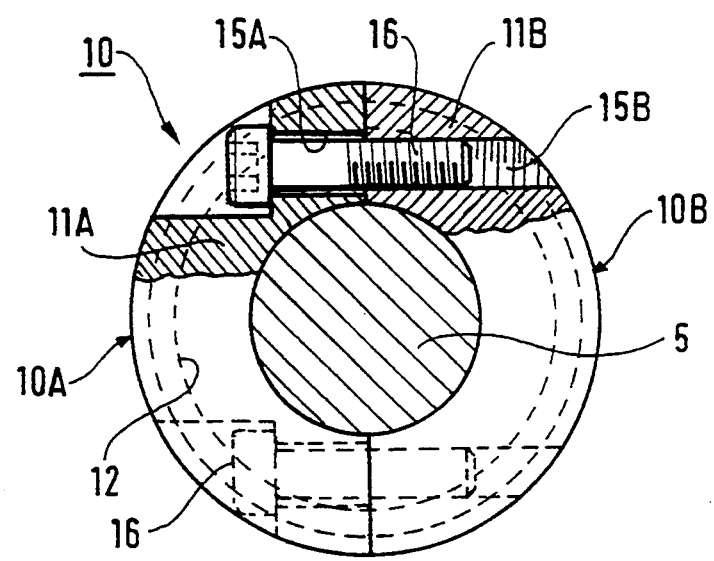
FIG. 2 is a view partially in section and on an enlarged scale showing one of the insulation-shrinkage prevention devices of FIG. 1.

As shown clearly in FIG. 2, the ring 10 is formed of two semi-cylindrical half-shells 10A, 10B that can be joined together around the conductor and around the end portion of the insulation of the cable.

The two half-shells are clamped held together so that they can be mechanically fixed to the conductor of the cable. Two holes 15A or 15B that are parallel and disposed transversely to the axis of the ring are provided for this purpose in the front semi-annular shoulder 11A or 11B in each of the half-shells. The two pairs of holes 15A–15B passing through the ring are situated on respective sides of the bore in the front shoulder. Two screws 16 engaged in the two pairs of holes clamp the two half-shells together on the conductor. Each of the screws is integrated in the resulting ring by being received entirely in the pair of holes in which it is engaged, one of the holes, e.g. 15A, being smooth and having an enlarged end at the outside end of the hole so that the screw head can be received such that it does not project outside the ring, and the other hole 15B being tapped so that thread on the screw can be engaged therein.

FIG. 1 shows that the two insulation-shrinkage prevention devices 10 equipping the prepared ends of the two cables take up a negligible amount of space and are integrated in the splice although they are mounted prior to the splice and independently therefrom. The devices require no special dimensioning of the two prepared ends to enable the devices to be mounted, nor to enable the splice to be mounted subsequently.

FIG. 3 shows conventional cable end equipment or cable termination equipment mounted on the prepared end of a cable 20. This cable 20 is analogous to the cables connected via the splice in FIG. 1. The synthetic insulation 23 of the cable is also bared over the prepared end of the cable, and is set back from the bared conductor 25 thereof.

The cable termination comprises: a connection end-piece 26 which is in part threaded over the conductor 25 and is secured thereto, e.g. by crimping, punching or some other fixing method; a shrink-fittable insulating protective sleeve 27 which, in this example, has peripheral fins or sheds 27A and clamps the bared insulation 23 of the prepared end of the cable; and an insulating cap 28 which is threaded over and clamps the connection end-piece 26 passing therethrough, and which is secured to the end of the sleeve 27, e.g. by gluing.

The cable equipped with the termination is also equipped with an insulation-shrinkage prevention device referenced 30. This device 30 is similar to the devices 10 shown in FIG. 1. Like those devices, it has a front shoulder 31 for abutting against the end of the insulation 23, and a rear shoulder 32 for retaining the ring by engaging in a peripheral groove 23A in the end portion of the insulation 23. Like the devices in FIG. 1, the device shown in FIG. 3 is formed of two half-shells clamped together by means of screws 36 and is secured to the conductor 25 in this way.

Device 30 differs from the FIG. 1 devices 10 in that it has a middle annular rib 37 provided on the front shoulder 31 and projecting into the bore defined by the inner circumferential surface of the front shoulder 31. The diameter of the bore is further left slightly larger than the diameter of the conductor 25. The rib 37 is received in a corresponding groove 26A provided in the outer periphery of the connection end-piece 26. The rib is locked therein by being a tight fit in the groove so that the rib is fixed to the connection end-piece which is itself fixed to the conductor.

Naturally, in a variant, the device 30 may be identical to the FIG. 1 devices 10, in which case device 30 is fixed directly to the bared conductor, the connection end-piece then not covering the bared conductor entirely.

FIG. 4 shows another embodiment of the insulation-shrinkage prevention device 40. Like the above-mentioned devices, device 40 is mounted and retained on the prepared end of a cable 50 having synthetic insulation 53 and a conductor 55, which cable is to receive an arbitrary item of connection equipment, such as a splice for splicing it to another cable, or a cable termination. Device 40 is formed of a ring which has both a shoulder 41 for abutting against the end of the insulation, which shoulder is disposed in an intermediate position instead of being at the front of the ring, and a rear shoulder 42 for retaining the ring by engaging in a peripheral groove 53A in the insulation 53. The ring further has a cylindrical "front" section 44 having an inside diameter that is substantially equal to or very slightly larger than the outside diameter of the conductor which it covers and to which it is secured.

Ring 40 also comprises two half-shells and is of substantially uniform thickness over its length. Its two half-shells are joined together and secured to the conductor 51 in particular by gluing, screwing, crimping, punching, welding, soldering, or any other suitable means, shown diagrammatically at 45 between the front section 44 and said conductor. The front section optionally has its bore tapped or scored, as shown, for the purposes of such fixing or for improving such fixing, depending on the fixing means used.

In particular, it should be noted that such a ring 40 may be crimped at the same time as the connection end-piece is mounted on the conductor of the cable, when the cable is equipped with a cable termination (FIG. 3).

In the above-described embodiments, the insulation-shrinkage prevention device is made of, for example metal and is in such as aluminum, or temperature-resistant plastic. The device can be mounted on a cable and removed therefrom on numerous occasions without being deteriorated. This is particularly advantageous in cable splices, especially during routine tests on the splices.

The device further offers the advantage of being suitable for use both in cable terminations and in splices, unlike the prior art device.

I claim:

1. An insulation-shrinkage prevention device for preventing insulation from shrinking back on a power cable, the insulation covering a conductor except on a prepared end of the cable, which end is to receive connection equipment, and where the insulation is set back relative to the conductor to expose the conductor, the connection equipment optionally including termination equipment having a connection end-piece locked on the exposed conductor, said device comprising:
a ring having at least two annular shoulders, one of the shoulders for abutting against a front face of the insulation, the other shoulder for engaging a periphery of an end portion of the insulation, when installed said ring being mounted directly in place on the exposed conductor and on the end portion of the insulation of the prepared end of the cable, and being secured to the exposed conductor by retaining means integrated in said ring.

2. A device according to claim 1, wherein said ring comprises two half-shells, wherein the shoulders are disposed at front and rear ends of said ring, and wherein said retaining means are integrated in the front end of said ring for clamping said half-shells together onto the exposed conductor.

3. A device according to claim 2, wherein said retaining means comprise screws engaged in a pair of holes provided in the front end of said ring and in both of said half-shells for securing said half-shells together and for applying a clamping pressure to the exposed conductor via the front end of said ring.

4. A device according to claim 1, wherein when the optional connection end-piece is locked on the exposed connector, the shoulder abutting against the front face of the insulation is provided with an inwardly projecting annular rib which is received in a groove provided in a periphery of the connection end-piece.

5. A device according to claim 1, wherein the shoulder for abutting against the front face of the insulation is an intermediate portion of said ring, and wherein an end of said ring to be opposite the insulation has an inside diameter substantially equal to the diameter of the exposed conductor and is secured to the exposed conductor when installed.

6. A device as recited in claim 3, wherein the pair of holes extend completely through said ring, and wherein the screws are countersunk so as not to protrude from said ring.

7. A device as recited in claim 5, wherein the end of said ring opposite the insulation is roughened on an inner peripheral surface thereof to facilitate securing the ring to the exposed conductor.

8. An insulation-shrinkage prevention device for preventing insulation from shrinking back on a power cable, the insulation covering a conductor except on a prepared end of the cable, which end is to receive connection equipment, and where the insulation is set back relative to the conductor to expose the conductor, the connection equipment including termination equipment having a connection end-piece locked on the exposed conductor, said device comprising:
a ring having at least two annular shoulders, one of the shoulders for abutting against a front face of the insulation and being provided with an inwardly projecting annular rib for being received in a groove provided in a periphery of the connection end-piece, the other shoulder for engaging a periphery of an end portion of the insulation.

9. A device as recited in claim 8, wherein the ring comprises two half-shells, and further comprising retaining means for securing the two half-shells together and for securing the ring around the connection end-piece.

10. An insulation-shrinkage prevention device for preventing insulation from shrinking back on a power cable, the insulation covering a conductor except on a prepared end of the cable, which end is to receive connection equipment, and where the insulation is set back relative to the conductor to expose the conductor, said device comprising:
a ring having at least two annular shoulders, one of the shoulders for abutting against a front face of the insulation, the other shoulder for engaging a periphery of an end portion of the insulation, when installed said ring being mounted directly in place on the exposed conductor and on the end portion of the insulation of the prepared end of the cable, wherein the shoulder abutting against the front face of the insulation is an intermediate portion of said ring, and wherein an end of said ring opposite the insulation has an inside diameter substantially equal to the diameter of the exposed conductor and is secured to the exposed conductor.

11. A device as recited in claim 10, wherein the end of said ring to be opposite the insulation is roughened on an inner peripheral surface thereof to facilitate securing the ring to the exposed conductor.

* * * * *